United States Patent
Choi et al.

(10) Patent No.: US 10,068,572 B2
(45) Date of Patent: *Sep. 4, 2018

(54) IMAGE PROCESSING APPARATUS HAVING A VOICE CONTROL FUNCTION AND CONTROL METHOD THEREOF

(71) Applicant: SAMSUNG ELECTRONICS CO., LTD., Gyeonggi-do (KR)

(72) Inventors: Chan-hee Choi, Seoul (KR);
Kyung-mi Park, Suwon-si (KR);
Hee-seob Ryu, Hwaseong-si (KR);
Chan-sik Bok, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,009

(22) Filed: Nov. 9, 2016

(65) Prior Publication Data
US 2017/0053649 A1 Feb. 23, 2017

Related U.S. Application Data

(63) Continuation of application No. 14/494,183, filed on Sep. 23, 2014, now Pat. No. 9,519,455.

(30) Foreign Application Priority Data

Oct. 15, 2013 (KR) .......................... 10-2013-0122675

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/28* (2013.01); *G10L 15/30* (2013.01);
(Continued)

(58) Field of Classification Search
CPC ....................................................... G06F 3/167
(Continued)

(56) References Cited

U.S. PATENT DOCUMENTS 6,415,258 B1   7/2002  Reynar et al.
8,233,393 B2   7/2012  Beightol et al.
(Continued)

FOREIGN PATENT DOCUMENTS

CN      1201225 C       5/2005
CN      102118886 A     7/2011
(Continued)

OTHER PUBLICATIONS

Communication dated Jan. 15, 2015 issued by International Searching Authority in counterpart International Application No. PCT/KR2014/008828.
(Continued)

*Primary Examiner* — Susan McFadden
(74) *Attorney, Agent, or Firm* — Sughrue Mion, PLLC

(57) ABSTRACT

An image processing apparatus, which includes a voice input receiver configured to receive a voice input of user, a signal processor configured to recognize and process the received voice input received through the voice input receiver, a buffer configured to store the voice input, and a controller configured to determine whether a voice recognition function of the signal processor is activated and control the signal processor to recognize the voice input stored in the buffer in response to the voice recognition function being determined to be activated. The controller is further configured to store the received voice input in the buffer in response to the received voice input being input through the voice input receiver while the voice recognition
(Continued)

function is not activated, so that the received voice input is recognized by the signal processor when the voice recognition function is activated.

15 Claims, 7 Drawing Sheets

(51) Int. Cl.
G10L 15/28 (2013.01)
H04N 21/422 (2011.01)
H04N 21/433 (2011.01)
G10L 15/30 (2013.01)
H04N 21/234 (2011.01)
H04N 21/4415 (2011.01)

(52) U.S. Cl.
CPC . *H04N 21/23418* (2013.01); *H04N 21/42203* (2013.01); *H04N 21/42204* (2013.01); *H04N 21/4331* (2013.01); *H04N 21/4415* (2013.01); *G10L 2015/223* (2013.01)

(58) Field of Classification Search
USPC .......................................................... 704/246
See application file for complete search history.

(56) References Cited

U.S. PATENT DOCUMENTS

| 9,043,211 | B2 | 5/2015 | Haiut et al. |
| 2009/0254351 | A1 | 10/2009 | Shin et al. |
| 2011/0071832 | A1 | 3/2011 | Handa et al. |
| 2012/0130712 | A1 | 5/2012 | Shin et al. |
| 2013/0003945 | A1 | 1/2013 | Caldwell et al. |
| 2013/0085905 | A1* | 4/2013 | Menon .................. G06Q 10/06 705/30 |
| 2013/0183944 | A1 | 7/2013 | Mozer et al. |
| 2017/0024100 | A1* | 1/2017 | Pieper .................. G06F 3/0486 |

FOREIGN PATENT DOCUMENTS

| CN | 102945671 A | 2/2013 |
| CN | 103021413 A | 4/2013 |
| EP | 1091346 A2 | 4/2001 |
| EP | 2109295 A1 | 10/2009 |
| EP | 1168302 B1 | 8/2010 |
| KR | 10-0566284 A | 3/2006 |
| KR | 10-0641148 A | 11/2006 |
| KR | 10-1083913 A | 11/2011 |

OTHER PUBLICATIONS

Communication dated May 12, 2017, issued by the European Patent Office in counterpart European Patent Application No. 14853920.8.
Communication dated Jun. 20, 2017, issued by the European Patent Office in counterpart European Patent Application No. 14853920.8.
Communication dated Jun. 20, 2017, issued by the State Intellectual Property Office of the People's Republic of China in counterpart Chinese Patent Application No. 201480056213.4.
Communication dated May 18, 2018, from the State Intellectual Property Office of People's Republic of China in counterpart Application No. 201480056213.4.

* cited by examiner

IMAGE PROCESSING APPARATUS HAVING A VOICE CONTROL FUNCTION AND CONTROL METHOD THEREOF

CROSS-REFERENCE TO RELATED APPLICATIONS

This application is a continuation application of U.S. application Ser. No. 14/494,183 filed on Sep. 23, 2014, which claims priority from Korean Patent Application No. 10-2013-0122675, filed on Oct. 15, 2013 in the Korean Intellectual Property Office, the entire disclosures of which are incorporated herein by reference in their entireties.

BACKGROUND

Field

Apparatuses and methods consistent with the exemplary embodiments relate to an image processing apparatus which processes a video signal to be displayed as an image and a control method thereof. In particular, exemplary embodiments relate to an image processing apparatus which can recognize a user voice command and perform a function or operation corresponding to the voice command, and a control method thereof.

Description of the Related Art

A related art image processing apparatus processes a video signal/video data received from an exterior through various imaging processes. The related art image processing apparatus displays the processed video signal as an image on its own display panel, or outputs the processed video signal to a separate display apparatus so that the processed video signal can be displayed as an image on the display apparatus having a panel. In other words, the related art image processing apparatus may include a panel capable of displaying an image, or may not include the panel as long as the related art image processing apparatus can process the video signal. An example of the former case is a television (TV). Further, an example of the latter case is a set-top box.

With technological development, various functions of the related art image processing apparatus have continuously been added and extended. In terms of the related art image processing apparatus, there have been proposed various structures or methods for inputting a command reflecting a user intention to the image processing apparatus. For example, in the related art, when a user presses a key/button on the remote controller, the remote controller wirelessly transmits a control signal to the image processing apparatus so that an operation desired by a user can be performed. However, various configurations for reflecting a user intention to control the image processing apparatus have been proposed in such a manner that the image processing apparatus senses and analyzes a user motion, utterance, etc., and performs a corresponding operation.

SUMMARY

An aspect of an exemplary embodiment may provide an image processing apparatus including: a voice input receiver configured to receive a voice input of user; a signal processor configured to recognize and process the received voice input received through the voice input receiver; a buffer configured to store the voice input; and a controller configured to determine whether a voice recognition function of the signal processor is activated and control the signal processor to recognize the voice input stored in the buffer in response to the voice recognition function being determined to be activated wherein the controller is further configured to store the received voice input in the buffer in response to the received voice input being input through the voice input receiver while the voice recognition function is not activated, so that the received voice input is recognized by the signal processor when the voice recognition function is activated.

The image processing apparatus may further include a communication interface configured to communicate with a server performing a recognition process for the received voice input, wherein the voice recognition function may include an internal processing method function in which the recognition process for the received voice input is performed by the signal processor, and an external processing method in which the recognition process for the received voice input is performed by the server, and wherein the controller may be further configured to activate each of the internal processing method function and the external processing method function according to activation of the voice recognition function.

The controller may be further configured to activate the external processing method function by a communication connection between the image processing apparatus and the server.

The controller may be further configured to activate the internal processing method function by collecting a plurality of commands previously registered and used in at least one application being executed in the image processing apparatus or at least one external device being connected to the image processing apparatus, from at least one of the at least one application and the at least one external device, based on a current state of an execution environment of the image processing apparatus, and by providing a list of commands with the collected commands.

The commands may include a previously defined command for a specific operation used by the at least one external device or the at least one application for supporting the voice recognition.

The controller may be further configured to determine a size of the voice input being stored in the buffer in accordance with a progress of activating the voice recognition function during a preparatory period for the voice recognition, the preparatory period ranging from a time when a starting event for activating the voice recognition occurs to a time when the voice recognition structure is activated.

The controller may be further configured to set up the size in the buffer to be relatively small in response to determining that the progress is relatively quick, and set up the size in the buffer to be relatively large in response to determining that the progress is relatively slow.

Under the external processing method function, the controller may be further configured to set up the size in the buffer to be relatively large in response to determining that a network response speed with respect to the server is relatively slow.

Under the internal processing method function, the controller may be further configured to provide a list of commands by collecting a plurality of commands previously registered and used in at least one application being executed in the image processing apparatus or at least one external device being connected to the image processing apparatus, from at least one of the at least one application and the at least one external device, and set up the size in the buffer to be relatively large in response to a number of the commands in the list of commands being relatively large.

The controller may be further configured to determine whether one of the internal processing method function and the external processing method function is activated in response to a total size of the data stored in the buffer exceeding the determined size in the buffer, and the controller may be further configured to process the data of the buffer according to the one activated method function and delete the processed data from the buffer in response to determining that one method function of the internal processing method function and the external processing method function is activated.

The controller may be further configured to delete the data in the buffer in response to determining that any one method function of the internal processing method function and the external processing method function is not activated.

The image processing apparatus may further include a temporary storage memory configured to store data to be processed by the signal processor or the controller temporarily, wherein the controller may be further configured to form the buffer in a preset storing space of the temporary storage memory.

An aspect of an exemplary embodiment may provide a control method of an image processing apparatus, the method including: generating a preset event for activating a voice recognition function from an inactivated state; and recognizing and processing an voice input by the voice recognition function activated, wherein the recognizing and processing the voice input by the voice recognition function activated may include: determining a size of the voice input being stored in a buffer of the image processing apparatus; and storing data of the voice input in the buffer in response to the voice input being received while the voice recognition function is not activated, so that the received voice input is recognized when the voice recognition function is activated.

The voice recognition function may include an internal processing method function in which a recognition process for the voice input is performed by the image processing apparatus, and an external processing method in which the recognition process for the voice input is performed by a server communicating with the image processing apparatus, and each of the internal processing method function and the external processing method function may be activated according to activation of the voice recognition function.

The external processing method function may be activated by a communication connection between the image processing apparatus and the server.

The internal processing method function may be activated by collecting a plurality of commands previously registered and used in at least one application being executed in the image processing apparatus or at least one external device being connected to the image processing apparatus, from at least one of the at least one application and the at least one external device, based on a current state of an execution environment of the image processing apparatus, and by providing a list of commands with the collected commands.

The commands may include a previously defined command for a specific operation used by the at least one external device or the at least one application for supporting the voice recognition.

The determining the size of the voice input being stored in the buffer may include determining the preset buffer size of the buffer in accordance with a progress of activating the voice recognition function during a preparatory period for the voice recognition, the preparatory period ranging from a time when a starting event for activating the voice recognition occurs to a time when the voice recognition structure is activated.

The determining the size in the buffer may include setting up the size in the buffer to be relatively small in response to determining that the progress is relatively quick, and setting up the size in the buffer to be relatively large in response to determining that the progress is relatively slow.

Under the external processing method function, the determining the size in the buffer may include setting up the size in the buffer to be relatively large in response to determining that a network response speed with respect to the server is relatively slow.

Under the internal processing method function, the determining the size in the buffer may include providing a list of commands by collecting a plurality of commands previously registered and used in at least one application being executed in the image processing apparatus or at least one external device being connected to the image processing apparatus, from at least one of the at least one application and the at least one external device, and setting up the size in the buffer to be relatively large in response to a number of the commands in the list of commands being relatively large.

The storing the data of the voice input in the buffer may include: determining whether one of the internal processing method function and the external processing method function is activated in response to a total size of the data stored in the buffer exceeds the determined size in the buffer; and processing the data of the buffer according to the one activated method function and deleting the processed data from the buffer in response to determining that one method function of the internal processing method function and the external processing method function is activated.

The storing the data of the voice input in the buffer may include deleting the data in the buffer in response to determining that any one method of the internal processing method function and the external processing method function is not activated.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
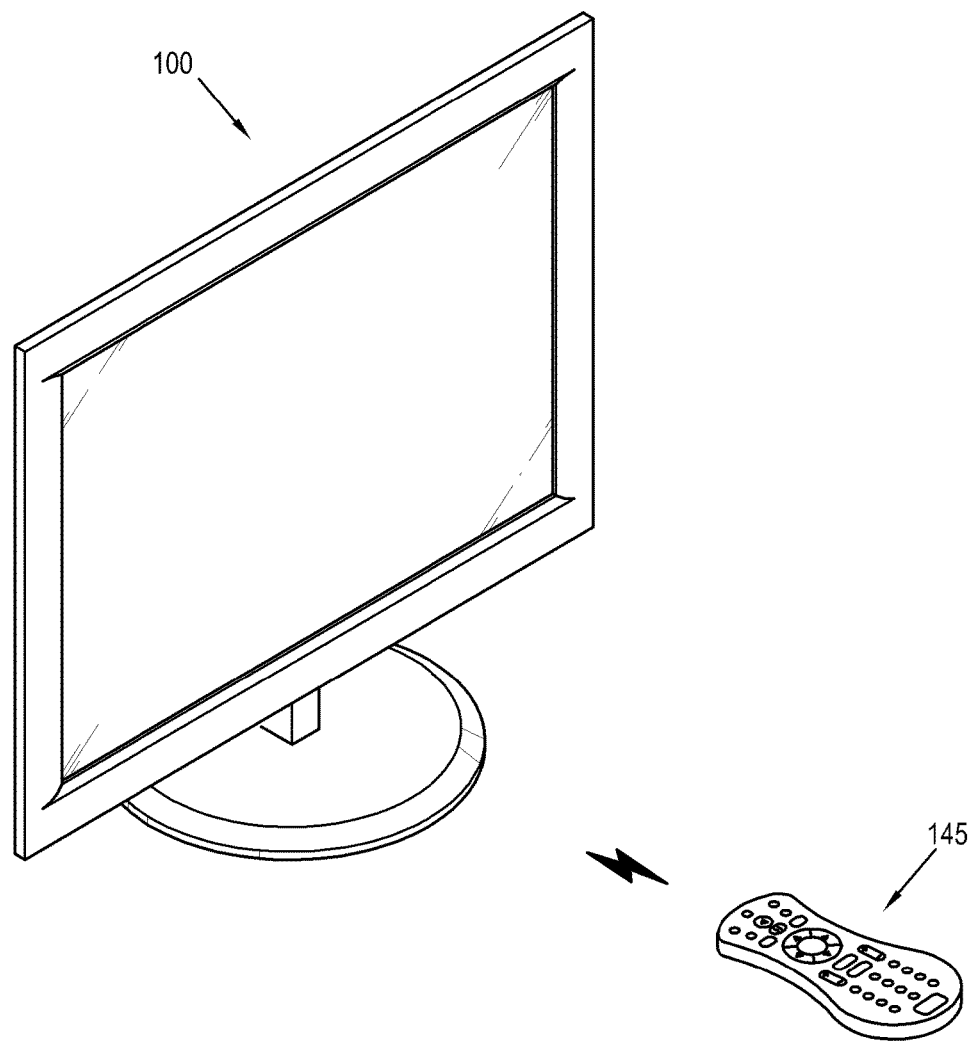
FIG. 1 shows an example of an image processing apparatus or a display apparatus according to a first exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, but this does not mean that the omitted parts are unnecessary for realization of apparatuses or systems to which the exemplary embodiments are applied. Like reference numerals refer to like elements throughout.

FIG. 1 shows an example of an image processing apparatus or a display apparatus according to a first exemplary embodiment. In this exemplary embodiment, the image processing apparatus 100 is achieved by a display apparatus having a structure capable of displaying an image. However, an exemplary embodiment may be applied to an image processing apparatus that cannot display an image by itself. In this case, the image processing apparatus 100 is locally connected to a separate external display apparatus so that the image can be displayed on the external display apparatus.

As shown in FIG. 1, the display apparatus 100 in this exemplary embodiment processes video data of contents received from the exterior or internally provided, and displays an image corresponding to the contents. In this exemplary embodiment, the display apparatus 100 is achieved by a television (TV), but is not limited thereto. Further, an exemplary embodiment may include various types of the display apparatus capable of processing video data and displaying an image.

A user is placed in front of the display apparatus 100 and views an image displayed on the display apparatus 100. The display apparatus 100 provides a remote controller 145 as a part of an interface environment for allowing a user to control operations of the display apparatus 100, in which the remote controller 145 is separated from the display apparatus 100. The remote controller 145 includes various kinds of function buttons, a touch pad, a display, etc., and generates a control signal corresponding to a user control or input, thereby transmitting it to the display apparatus 100. Thus, the display apparatus 100 performs a preset operation in response to the control signal from the remote controller 145.

For example, if a user presses a channel switching button of the remote controller 145 while the display apparatus 100 displays a broadcasting image, the remote controller 145 generates a control signal for switching a channel and transmits the control signal to the display apparatus 100. The display apparatus 100 switches the channel in response to the control signal received from the remote controller 145 and displays a broadcasting image corresponding to the switched channel.

However, as the functions of the display apparatus 100 become various and complicated, the interface environments provided from the display apparatus 100 to a user are not limited to the remote controller 145. For example, the display apparatus 100 additionally includes structures for recognizing various user inputs, such as a voice recognition structure for recognizing a user utterance, a motion recognition structure for recognizing a user motion, etc., and performs a preset function or operation in response to the control signal received through a recognition structure.

Detailed configurations of the display apparatus 100 will be described with reference to FIG. 2.

Figure 2:
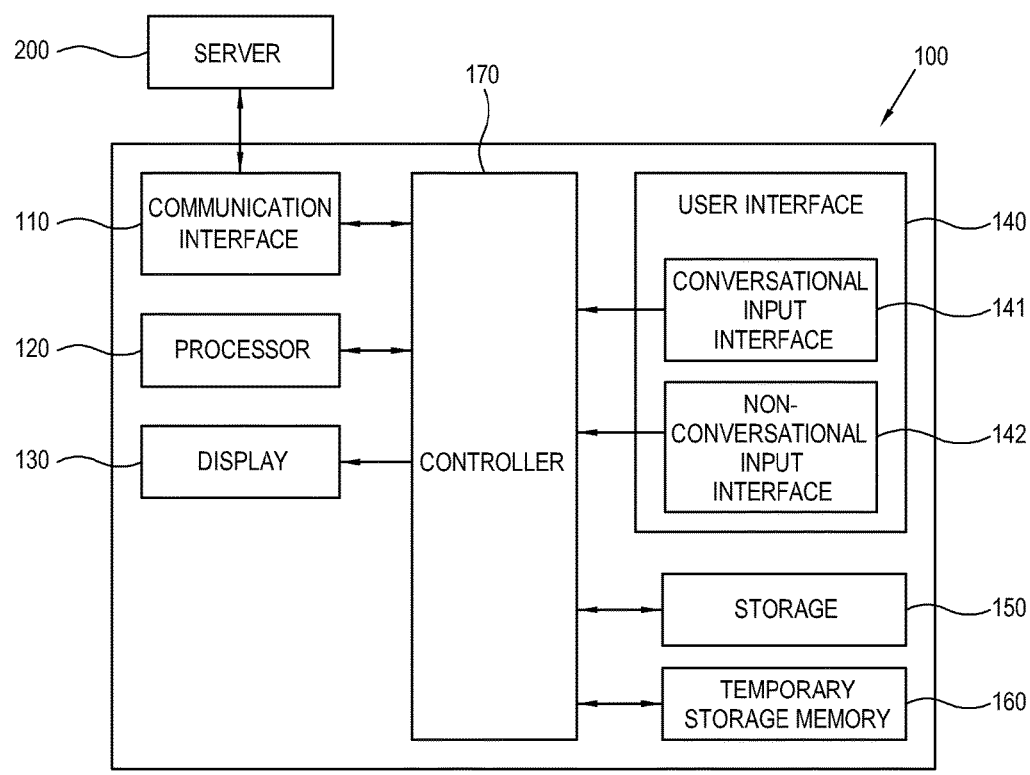
FIG. 2 is a block diagram of the display apparatus of FIG. 1.

FIG. 2 is a block diagram of the image processing apparatus 100.

As shown in FIG. 2, the display apparatus 100 includes a communication interface 110 which performs communication with an exterior to transmit/receive data/a signal, a processor 120 which processes data received in the communication interface 110 in accordance with preset processes, a display 130 which displays video data as an image if data processed in the processor 120 is the video data, a user interface 140 which is for a user input, a storage 150 which stores data/information, a temporary storage memory 160 which temporarily stores data to be processed, and a controller 170 which controls general operations of the display apparatus 100.

The communication interface 110 transmits/receives data so that interactive communication can be performed between the display apparatus 100 and a server 200 or an external device. The communication interface 110 accesses the server or the external device (not shown) through wide/local area networks or locally in accordance with preset communication protocols.

The communication interface 110 may be achieved by connection ports according to devices or an assembly of connection modules, in which the protocol for connection or the external device for connection is not limited to one kind or type. The communication interface 110 may be a built-in device of the display apparatus 100, or the entire or a part thereof may be added to the display apparatus 100 in the form of an add-on or dongle type.

The communication interface 110 transmits/receives a signal in accordance with protocols designated according to the connected devices, in which the signals can be transmitted/received based on individual connection protocols with regard to the connected devices. In the case of video data, the communication interface 110 may transmit/receive the signal bases on various standards such as a radio frequency (RF) signal, composite/component video, super video, Syndicat des Constructeurs des Appareils Radiorécepteurs et Téléviseurs (SCART), high definition multimedia interface (HDMI), display port, unified display interface (UDI), or wireless HD, etc.

The processor 120 performs various processes with regard to data/a signal received in the communication interface 110. If the communication interface 110 receives the video data, the processor 120 applies an imaging process to the video data and the video data processed by this process is output to the display 130. Therefore, the display 130 is allowed to display an image based on the corresponding video data. If the signal received in the communication interface 110 is a broadcasting signal, the processor 120 extracts video, audio and appended data from the broadcasting signal tuned to a certain channel, and adjusts an image to have a preset resolution, so that the image can be displayed on the display 130.

There is no limit to the kind of imaging processes to be performed by the processor 120. For example, there is decoding corresponding to an image format of the video data, de-interlacing for converting the video data from an interlace type into a progressive type, scaling for adjusting the video data to have a preset resolution, noise reduction for improving image qualities, detail enhancement, frame refresh rate conversion, etc.

The processor 120 may perform various processes in accordance with the kinds and attributes of data. Thus, the process to be implemented in the processor 120 is not limited to the imaging process. Also, the data processible in the processor 120 is not limited to only that received in the communication interface 110. For example, the processor 120 processes a user utterance through a preset voicing process when the user interface 140 receives the corresponding utterance.

The processor 120 may be achieved by an image processing board (not shown) in which a system-on-chip where various functions are integrated or an individual chip-set capable of independently performing each process is mounted on a printed circuit board. The processor 120 may be built-in the display apparatus 100.

The display 130 displays the video signal/the video data processed by the processor 120 as an image. The display 130 may be achieved by various display types such as liquid crystal, plasma, a light-emitting diode, an organic light-diode, a surface-conduction electron-emitter, a carbon nano-tube and a nano-crystal. However, the display 130 is not limited thereto.

The display 130 may additionally include an appended element in accordance with its types. For example, in the case of the liquid crystal type, the display 130 may include a liquid crystal display (LCD) panel (not shown), a backlight unit (not shown) which emits light to the LCD panel, a panel driving substrate (not shown) which drives the panel (not shown), etc.

The user interface 140 transmits various preset control commands or information to the controller 170 in accordance with a user control or input. The user interface 140 may generate information corresponding to various events that occur in accordance with a user intention and transmits it to the controller 170. The events that occur by a user may have various forms, and may for example include a user control, utterance, gesture, etc.

The user interface 140 is provided corresponding to a user method of inputting information. Thus, the user interface 140 may sense the information input by the corresponding method. Thus, the user interface 140 is classified into a conversational input interface 141 and a non-conversational input interface 142.

The conversational input interface 141 is provided to receive a user utterance. In other words, the conversational input interface 141 is achieved by a microphone and senses various sounds from the external environments of the display apparatus 100. The conversational input interface 141 not only generally senses a user utterance but also senses sounds generated due to various environmental factors (which exclude the user).

The non-conversational input interface 142 is provided to receive a user input excluding the utterance. In this case, the non-conversational input interface 142 may be achieved in various forms, and may, e.g., include the remote controller 145 (see FIG. 1), a menu-key or input panel provided outside the display apparatus 100, a motion sensor or camera for sensing a user gesture, etc.

Alternatively, the non-conversational input interface 142 may be achieved by a touch screen installed on the display 130. In this case, a user touches an input menu or user interface (UI) image displayed on the display 130 so that a preset command or information can be transmitted to the controller 170.

In this exemplary embodiment, the conversational input interface 141 may be installed in a main body of the display apparatus 100. However, exemplary embodiments are not limited thereto. Alternatively, the conversational input interface 141 may be added to the remote controller 145 or may be achieved by an external device separate from the display apparatus 100.

The storage 150 stores various data under control of the controller 170. The storage 150 is achieved by a nonvolatile memory, such as a flash memory, a hard disk drive, etc., so as to retain data regardless of power on/off of the system. The storage 150 is accessed by the controller 170 so that previously stored data can be read, recorded, modified, deleted, updated, etc.

The temporary storage memory 160 temporarily stores data being processed by or being on standby to be processed by the processor 120 or the controller 170. For example, a storage is needed for temporarily storing a video signal received in the communication interface 110 so that the processor 120 can process the video signal to be displayed on the display 130. Thus, the temporary storage memory 160 serves as this storage. Further, a random access memory (RM) that the controller 170 achieved by a central processing unit (CPU) accesses may be regarded as the temporary storage memory 160. Similarly, the temporary storage memory 160 stores data only while the display apparatus 100 operates data. Thus, the temporary storage memory 160 is achieved by a volatile memory (contrary to the storage 150).

The temporary storage memory 160 is accessed by a plurality of elements (i.e., not just one element). For example, a plurality of modules (not shown) in the processor 120 respectively needs storage for storing data to be processed. Thus, the temporary storage memory 160 allocates storage regions to data according to respective modules (not shown). Such allocation for the storage regions is performed according to ranges of a preset memory address.

The controller 170 is achieved by a central processing unit (CPU), and controls operations of general elements of the display apparatus 100, such as the processor 120, in response to occurrence of a predetermined event. For example, when video data corresponding to predetermined contents is received through the communication interface 110, the controller 170 controls the processor 120 to process the video data to be displayed as an image on the display 130. Also, when a user input event occurs through the user interface 140, the controller 170 controls the element such as the process 120 to perform the preset operation corresponding to the event.

With this configuration, a procedure that the display apparatus 100 performs a preset operation corresponding to a user utterance will be described.

If a user utterance is input through the conversational input interface 141, the controller 170 controls the input utterance to be converted into a voice command corresponding to a text. The utterance refers to a user voice, and the voice command refers to data corresponding to contents of the utterance converted in the form of a text.

There are several methods of converting the user utterance into a voice command corresponding to a text. One method is that the processor 120 converts a voice signal of the utterance received through the conversational input interface 141 into the voice command in accordance with its own converting algorithms.

When the communication interface 110 communicates with a speech-to-text (STT) server (not shown) for converting a user utterance into a voice command, another method is that the processor 120 transmits the voice signal of the utterance received through the conversational input interface 141 to the STT server (not shown) and receives a voice command corresponding to the voice signal from the STT server (not shown).

The controller 170 employs one of the two methods, i.e., the internal processing method and the external processing method, in order to derive a result corresponding to such a voice command.

In the case of using the internal processing method, the controller 170 controls the processor 120 to analyze the voice command. The processor 120 builds up a database/list of candidate commands corresponding to the voice command, and performs searching in the built-up data. Therefore, a command is derived corresponding to the voice command. Further, the processor 120 performs an operation in response to the derived command.

On the other hand, the procedure employing the external processing method is as follows. The controller 170 transmits a voice command corresponding to a user utterance to the server 200. The server 200 is a conversational server that analyzes the voice command and determines an operation/action/result corresponding to the voice command. The name of the server such as the STT server and the conversational server is given for convenience, and does not limit the characteristics of the server.

The server 200 retrieves various operations of the display apparatus 100 in accordance with the voice command. The server 200 analyzes the voice command received from the display apparatus 100, and returns the control signal for performing the operation corresponding to the voice command according to analyzed results or information retrieved based on the voice command to the display apparatus 100.

The controller 170 performs the corresponding operation in accordance with the control signal or information returned from the server 200.

However, the voice recognition structure for the display apparatus 100 needs to activate its function to process a user utterance so that the display apparatus 100 can perform the operations corresponding to the utterance. For example, in order to process a user utterance, there are needed advance preparations such as activating the conversational input interface 141 to sense a user utterance, building up a database of candidate commands in the case of the internal processing method, accessing the server 200 in the case of the external processing method, etc.

Such a voice recognition structure may be already activated in a booting stage of the display apparatus 100. On the other hand, the voice recognition structure may be activated when a certain trigger event occurs from a user in an initial state where the voice recognition structure is inactivated. The trigger event to be mentioned below refers to an event generated by a user to activate the voice recognition structure.

Below, the latter will be described in more detail.

For example, when a user presses a voice recognition button (not shown) of the remote controller 145 (refer to FIG. 1), the display apparatus 100 activates the voice recognition structure or function to recognize a user utterance. At this time, the display apparatus 100 activates both the voice recognition structure based on the internal processing method and the voice recognition structure based on the external processing method. In this exemplary embodiment, the structures based on both two processing methods are activated. However, exemplary embodiments are not limited thereto. Alternatively, one of them may be activated in accordance with designs of the display apparatus 100.

The display apparatus 100 can process a user utterance after the voice recognition structure is completely activated. A preparatory period for the voice recognition ranges from a time when a trigger event for activating the voice recognition occurs to a time when the voice recognition structure is completely activated. During this period, the display apparatus 100 changes the voice recognition structure from an inactivating state to an activating state.

Therefore, the display apparatus 100 cannot normally process a user utterance even though a user utters a sound during the preparatory period for the voice recognition. In other words, if a point of time when a user utters a sound after the user generates the trigger event is within the preparatory period for the voice recognition, the corresponding utterance is not processed or not normally processed because the display apparatus 100 does not complexly activate the voice recognition structure, thereby causing a result undesired by a user.

To prevent this, a related art display apparatus shows a message for informing a user that the voice recognition structure is being activated during the preparatory period for the voice recognition after the trigger event, and shows a message of informing the user that the voice recognition structure is completely activated after the preparatory period for the voice recognition is over.

However, such a related art method may have a problem that timing when the display apparatus 100 actually activates, the voice recognition structure may not be synchronized with timing of displaying the foregoing messages and it is inconvenient for a user to check the corresponding messages one by one.

Thus, according to an exemplary embodiment, the following methods are described below.

If a preset trigger event occurs in the state that the voice recognition function is inactivated, the display apparatus 100 activates the voice recognition function and processes a user utterance. When a user inputs the utterance during the preparatory period for the voice recognition between the time when the trigger event occurs and the time when the voice recognition is completely activated, the display apparatus 100 forms a preset capacity or size of buffer, stores data of the corresponding utterance in the buffer, and processes the data of the utterance stored in the buffer when the voice recognition function is completely activated.

Thus, the display apparatus 100 normally processes a user utterance and provides it to the user even though the user inputs the corresponding utterance during the preparatory period for activating the voice recognition structure. Also, the display apparatus 100 does not have to provide a separate message or a UI image to a user during the preparatory period. Therefore, the display apparatus 100 offers a normal voice recognition function while the user is oblivious to the preparatory period.

The processor 120 according to an exemplary embodiment will be described in detail.

Figure 3:
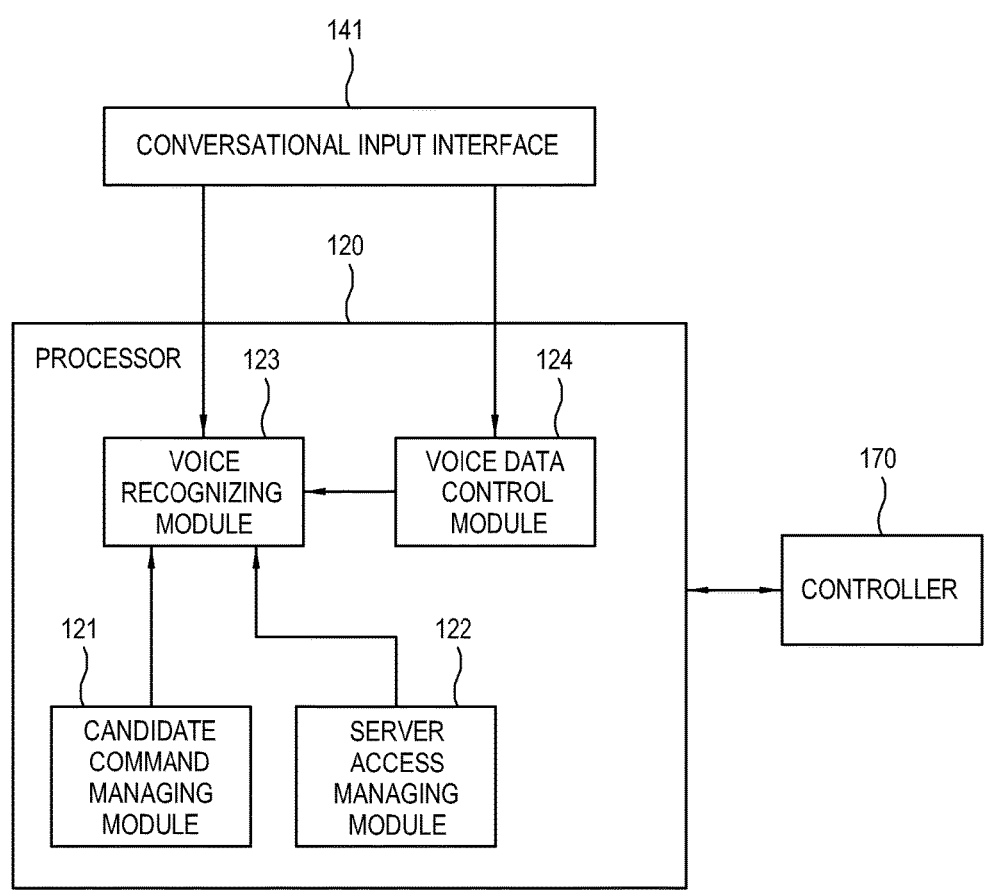
FIG. 3 is a block diagram of a processor for a voice recognition structure in the display apparatus of FIG. 1.

FIG. 3 is a block diagram showing the voice recognition structure of the processor 120.

As shown in FIG. 3, the processor 120 includes a plurality of blocks or modules 121, 122, 123 and 124 for processing data of a user's utterance input through the conversational input interface 141.

These modules 121, 122, 123 and 124 are classified according to their functions for convenience, and do not limit a way of achieving the processor 120 according to an exemplary embodiment. These modules 121, 122, 123 and 124 may be achieved by hardware or software. The modules 121, 122, 123 and 124 that constitute the processor 120 may individually perform their respective operations, or the processor 120 may sequentially perform the whole operations without being classified into the modules 121, 122, 123 and 124. Also, the operations of the processor 120 and the respective modules 121, 122, 123 and 124 are performed under control of the controller 170.

The processor 120 includes a candidate command managing module 121 for receiving and managing a candidate command, a server access managing module 122 for managing an accessing state to the server 200 (refer to FIG. 2), a voice recognizing module 123 for processing the data of the utterance received from the conversational input interface 141 and deriving a recognition result, and a voice data control module 124 for buffering the utterance data in accordance with an activated state of the voice recognizing module 123.

These modules 121, 122, 123 and 124 are inactivated while the voice recognition function is inactivated, and activated in response to the trigger event for activating the voice recognition function.

The candidate command managing module 121 is activated when the processor 120 employs the internal processing method to perform the voice recognition. If the trigger event occurs, the candidate command managing module 121 checks the current execution-environment conditions of the display apparatus 100. The candidate command managing module 121 collects candidate commands used by an application being currently executed in the display apparatus 100 and an external device (not shown) currently connected to the display apparatus 100 from the corresponding application and external device, and makes a list of candidate commands.

Such candidate commands are predefined commands that are used by the external device or the application for supporting the voice recognition. These commands are individually designated in accordance with the application and the external device. However, the candidate commands are not limited to a certain example since there are various formats and kinds of commands.

The list of candidate commands is referred to retrieve a command for an operation corresponding to a recognition result when the voice recognizing module 123 processes the recognition result of the utterance data.

The server access managing module 122 is activated when the processor 120 employs the external processing method to perform the voice recognition. When the trigger event occurs, the server access managing module 122 accesses the server 200 (refer to FIG. 2) for carrying out the voice recognition and manages a communication state. The server access managing module 122 transmits the utterance data to the server 200 in response to the requests of the voice recognizing module 123 and returns the recognition result of the corresponding utterance data to the voice recognizing module 123.

The voice recognizing module 123 analyzes the utterance data in accordance with the internal processing method, or derives the voice recognition result based on the results received from the server 200 in accordance with the external processing method from the server 200.

The voice data control module 124 monitors the states of the candidate command managing module 121, the server access managing module 122, and the voice recognizing module 123 when the trigger event occurs, and determines whether the whole voice recognition function of the processor 120 is completely activated, i.e., whether the preparatory period for the voice recognition is terminated.

The voice data control module 124 determines the size of a buffer through a preset method and dynamically builds up the buffer when receiving a user utterance from the conversational input interface 141 during the preparatory period for the voice recognition, and stores the data of the input utterance in the buffer. The method of determining the size of buffer will be described later. The buffer may be built up within a predetermined address range of the temporary storage memory 160 (refer to FIG. 2).

The voice data control module 124 stores the utterance data input during the preparatory period for the voice recognition in the buffer, and transmits the utterance data stored in the buffer to the voice recognizing module 123 when the preparatory period for the voice recognition is terminated so that the utterance data can be processed. Further, the voice data control module 124 initializes the buffer when the buffer is empty after the preparatory period for the voice recognition is terminated, and then becomes inactivated.

A control method of the display apparatus 100 according to an exemplary embodiment will be described with reference to FIGS. 4 and 5.

Figure 4:
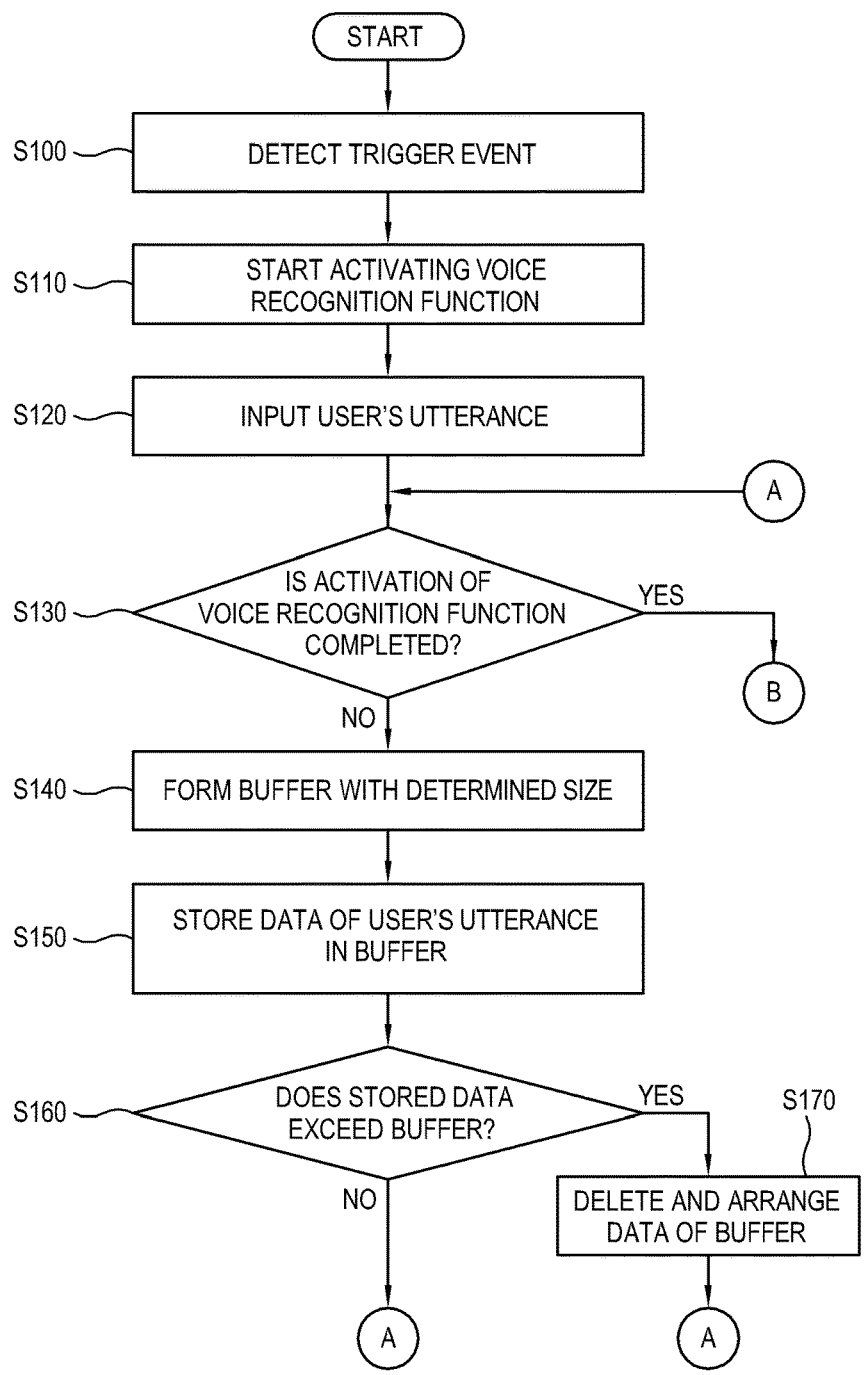
FIGS. 4 and 5 are flowcharts showing a control method of the display apparatus of FIG. 1.
Figure 5:
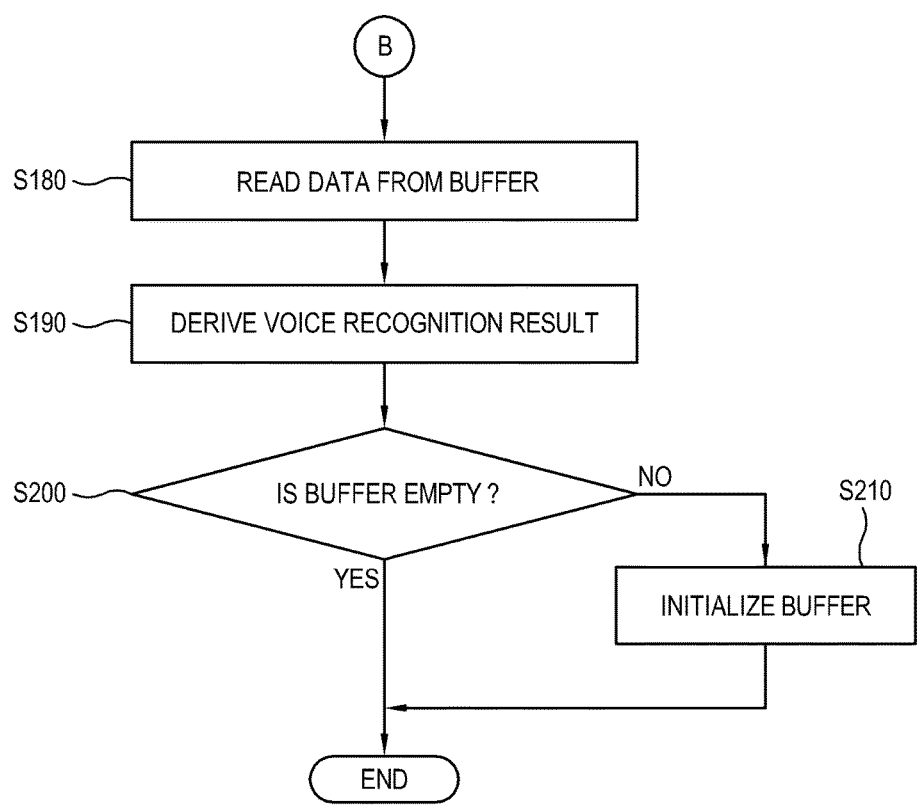

FIGS. 4 and 5 are flowcharts showing the control method of the display apparatus 100. In this exemplary embodiment, an initial state refers to the voice recognition function being inactivated.

As shown in FIG. 4, the display apparatus 100 senses the occurrence of the trigger event for activating the voice recognition function at operation S100. At operation, the display apparatus 100 starts activating the voice recognition function in response to the trigger event.

If receiving a user utterance at operation S120, the display apparatus 100 determines whether the voice recognition function is completely activated at operation S130. The voice recognition function may be activated by the internal processing method or the external processing method, which will be described later.

If it is determined that the voice recognition function is not activated, the display apparatus 100 determines the size of buffer and builds up the buffer at operation S140. The display apparatus 100 stores a user utterance data in the buffer at operation S150.

At operation S160, the display apparatus 100 determines whether a total size of stored data exceeds the size of buffer. The display apparatus 100 returns to operation S130 if it is determined that the total size of stored data does not exceed the size of buffer. The display apparatus 100 deletes and arranges the data of the buffer at operation S170 and then returns to the operation S130 if it is determined that the total size of stored data exceeds the size of buffer.

As shown in FIG. 5, if it is determined in operation S130 that the voice recognition function is fully activated, the display apparatus 100 reads the data from the buffer at operation S180. At operation S190, the display apparatus 100 derives a voice recognition result from the data of the buffer.

At operation S200, the display apparatus 100 determines whether there is unread or unprocessed data in the buffer, i.e., whether the buffer is empty. If the buffer is empty, the display apparatus 100 terminates the process and is on standby for receiving a user next utterance. On the other hand, if the buffer is not empty, the display apparatus 100 initializes the buffer at the operation S210 and terminates the process.

Some operations of the foregoing process will be described in more detail.

In the operation S100, the trigger event may occur through various methods. For example, the trigger event may occur by a certain button pressed by a user on the remote controller 145 (see FIG. 1), by an input on a user interface (UI) image, or by a user certain motion. In other words, the trigger event occurs in response to various preset inputs through the non-conversational input interface 142 (refer to FIG. 2).

The operation S110 for activating the voice recognition function, i.e., a preparatory stage for the voice recognition function may be carried out by the external processing method or the internal processing method.

In the case of using the external processing method for the activation, the display apparatus 100 checks a communication state with the server 200 (refer to FIG. 2) that analyzes the voice recognition, and determines whether it is normally possible to communicate with the server 200. Thus, the display apparatus 100 transmits and receives test data for testing an environment for the communication with the server 200 and checks an error rate. If it is possible to communicate with a plurality of servers 200, the display apparatus 100 may selectively access one server among the servers 200 in consideration of a communication state and other environmental factors.

In the case of using the internal processing method for the activation, the display apparatus 100 determines what application is being currently executed in the display apparatus 100 and what external device is being connected to the display apparatus 100 locally/through a network, in order to make a list of candidate commands utilized in the voice recognition. The display apparatus 100 collects commands previously registered to be used in the respective applications and external device, and makes the list of candidate commands with the collected commands. Alternatively, the display apparatus 100 may previously store the list of candidate commands that are set up in a manufacturing stage or acquired by reflecting a learning process of commands based on a usage history, and invokes this list.

Such a preparatory stage based on the external processing method and the internal processing method is just an example. Various preparatory stages may be applicable in accordance with designs of the display apparatus 100.

At operation S140, the method of determining the size of buffer is described below. The display apparatus 100 determines the size of buffer in accordance with the progress or speed of the preparatory stage for the voice recognition. If it is determined that the preparatory stage for the voice recognition is relatively quickly progressed, the size of buffer is determined to be relatively small in comparison to a total size of the buffer. If it is determined that the preparatory stage for the voice recognition is relatively slowly progressed, the size of buffer is determined to be relatively large in comparison to a total size of the buffer.

The method of determining the progress of the preparatory stage for the voice recognition may be individually applied to each of the external processing method and the internal processing method. Detailed descriptions about the foregoing examples of the external processing method and the internal processing method are described below.

In the case of the external processing method, the display apparatus 100 sets up the size of buffer to be relatively larger in comparison to a total size of the buffer as a speed of a network response to the server 200 becomes slower and as the environment for the communication with the server 200 becomes worse. Further, in the case of the external processing method, the display apparatus may communicate with one or more servers 200. However, the load to be processed increases as the size of buffer becomes larger. Therefore, there is a maximum value for the size of buffer. In other words, the display apparatus 100 sets up the size of buffer not to exceed the preset maximum size.

In the case of using the internal processing method, the display apparatus 100 sets up the size of buffer to be relatively larger in comparison to a total size of the buffer as the number of currently activated application and external devices increases, and as the number of candidate commands from the application and external device increases. However, even in this case, there is a maximum value for the size of buffer.

The operation S170 of arranging the data of the buffer will be described with reference to FIG. 6

Figure 6:
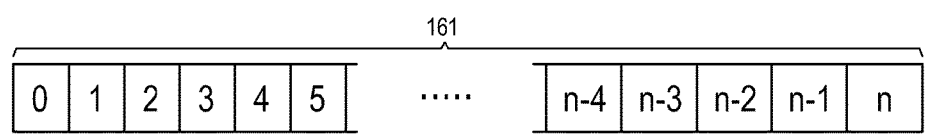
FIG. 6 shows an example of a dynamically allocated buffer in the display apparatus of FIG. 1.

FIG. 6 shows an example of a dynamically allocated buffer.

As shown in FIG. 6, a buffer 161 is built up during the preparatory stage for the voice recognition formed within a preset address range of the temporary storage memory 160 (see FIG. 2). The buffer 161 includes a total of n+1 unit packets from a packet number 0 to a packet number n.

When storing the utterance data, the display apparatus 100 stores the utterance data in the buffer 161 in order from the packet number 0. While the display apparatus 100 stores the utterance data in the buffer 161, the total data to be stored may exceed the packet number n of the buffer 161.

In this case, the display apparatus 100 stores the data by filling the buffer 161 with the data up to the packet number n, and emptying a section of the buffer 161 from the packet number 0 to a predetermined packet number. Therefore, the buffer 161 is prevented from an overflow.

When data is stored once, the display apparatus 100 empties the packet in the order of stored data. For example, if an overflow occurs in the buffer 161 at a point of time when a user utters five times, the display apparatus 100 deletes the first utterance data from the buffer 161 and stores the fifth utterance data in the buffer 161.

Then, when reading data from the buffer 161 as the preparatory stage is completed, the display apparatus 100 reads the data not from the packet number 0 of the buffer 161, but from the packet number corresponding to the earliest stored data.

If all the data of the buffer 161 is read and processed, the display apparatus 100 initializes or resets the buffers 161 because there is a need of temporarily storing the utterance data in the state that the voice recognition function is activated.

Meanwhile, in the foregoing exemplary embodiment, the data of the buffer is deleted and arranged when the total size of utterance data exceeds the size of buffer. However, exemplary embodiments are not limited thereto. Alternative exemplary embodiment will be described with reference to FIG. 7.

Figure 7:
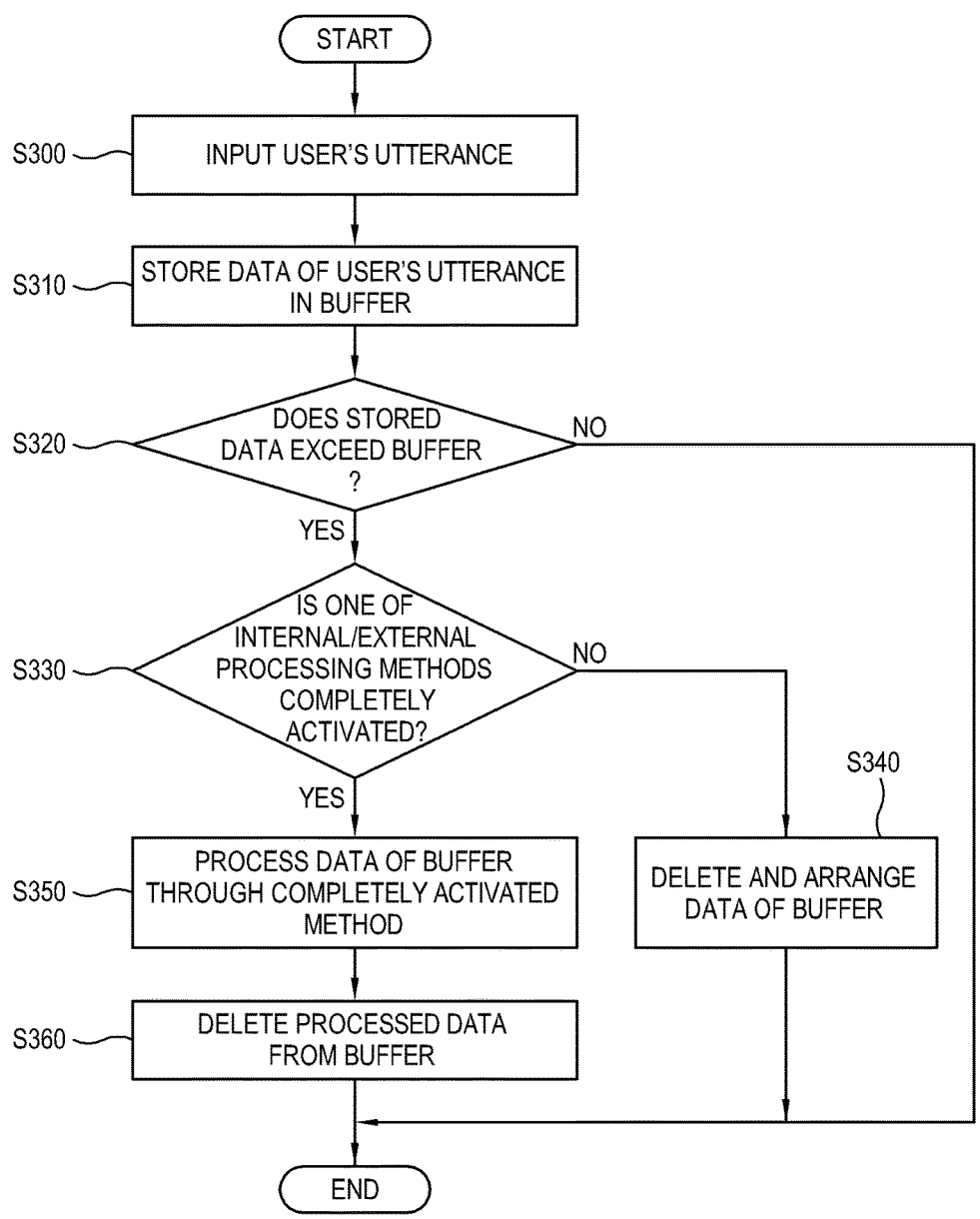
FIG. 7 is a flowchart showing a control method of a display apparatus according to a second exemplary embodiment during a preparatory stage for voice recognition.

FIG. 7 is a flowchart showing a control method of a display apparatus 100 according to a second exemplary embodiment during the preparatory stage for the voice recognition. This embodiment will only show operations performed during the preparatory stage for activating the voice recognition function after the trigger event.

As shown in FIG. 7, if a user utterance is input at operation S300, the display apparatus 100 stores the utterance data in the buffer at operation S310.

At operation S320, the display apparatus 100 determines whether the total size of data exceeds the size of buffer. If it is determined that the total size of data does not exceed the size of buffer, the display apparatus 100 terminates this process.

If it is determined that the total size of data exceeds the size of buffer, the display apparatus 100 determines whether the voice recognition function is completely activated by one method of the internal processing method and the external processing method at operation S330. If it is determined that the voice recognition function is not completely activated by one of the internal processing method and the external processing method, the display apparatus 100 deletes and arranges the data of the buffer at operation S340.

On the other hand, if it is determined that the voice recognition function is completely activated by one of the internal processing method and the external processing method, the display apparatus 100 first processes the data of the buffer by the activated function at operation S350. Then, the display apparatus 100 deletes the processed data from the buffer at operation S360.

Thus, the display apparatus 100 processes the data of the buffer through a partial voice recognition function as long as the voice recognition function is partially activated (even though the voice recognition function is not fully activated). Therefore, the data is prevented from overflowing the buffer.

For example, the internal processing method and the external processing method are different in the processes of the voice recognition function. Thus, the internal processing method and the external processing method are also different from each other in a time of completing the activation. If the communication environments for the display apparatus 100 are good and there are many applications being executed in the display apparatus 100, the external processing method more quickly completes the activation of the voice recognition function than the internal processing method. On the other hand, if the communication environments for the display apparatus 100 are bad and there are few applications being executed in the display apparatus 100, the internal processing method more quickly completes the activation of the voice recognition function than the external processing method.

Accordingly, which one method between the internal processing method and the external processing method completes the activation of the voice recognition function first may be varied depending on the current environments of the display apparatus 100.

Although a few exemplary embodiments have been shown and described, it will be appreciated by those skilled in the art that changes may be made in these exemplary embodiments without departing from the principles and spirit of the exemplary embodiments, the scope of which is defined in the appended claims and their equivalents.

What is claimed is:

1. A display apparatus comprising:
a voice input receiver configured to receive a voice input of a user;
a communication interface configured to communicate with an external server operable to perform a voice processing on the voice input;
a memory; and
at least one processor configured to:
in response to an event for activating a voice recognition function, determine, while the voice input receiver receives the voice input, whether the voice recognition function is activated, wherein, when the voice recognition function is activated, the display apparatus is in a communication state with the external server;
in response to determining that the voice recognition function is activated, control the communication interface to transmit the received voice input to the external server for the voice processing; and
in response to determining that the voice recognition function is not activated, control the memory to store the received voice input; and
in response to determining that the voice recognition function is subsequently activated, control the communication interface to transmit the stored voice input to the external server for the voice processing.

2. The display apparatus according to claim 1, wherein, in response to another determination that the communication interface is connected to the server, the processor is further configured to transmit the received voice input to the external server through the communication interface without storing the received voice input in the memory.

3. The display apparatus according to claim 1, wherein the processor is further configured to delete at least a part of the voice input stored in the memory if the voice input is transmitted to the external server.

4. The display apparatus according to claim 1, wherein the processor is further configured to delete at least a part of the voice input stored in the memory if a size of the voice input stored in the memory is larger than a predetermined value.

5. The display apparatus according to claim 1, wherein the voice input receiver receives the voice input from a remote controller for controlling the display apparatus.

6. The display apparatus according to claim 1, wherein the processor is further configured to transmit test data to the external server to determine whether the communication interface is connected to the external server.

7. The display apparatus according to claim 6, wherein the processor is further configured to determine whether the communication interface is connected to the external server based on an error rate of the test data.

8. A method of controlling a display apparatus, the method comprising:
receiving a voice input of a user;
in response to an event for activating a voice recognition function, determining, while receiving the voice input, whether the voice recognition function is activated, wherein, when the voice recognition function is activated, the display apparatus is in a communication state with an external server;
in response to the determining that the voice recognition function is activated, transmitting the received voice input to the external server for voice processing; and
in response to the determining that the voice recognition function is not activated, storing the received voice input in a memory of the display apparatus; and in response to the determining that the voice recognition function is subsequently activated, transmitting the stored voice input to the external server for the voice processing.

9. The method according to claim 8, further comprising:
in response to the determining that the display apparatus is connected to the external server, transmitting the received voice input to the server without storing the received voice input in the memory.

10. The method according to claim 8, further comprising:
deleting at least a part of the stored voice input if the stored voice input is transmitted to the external server.

11. The method according to claim 8, further comprising:
deleting at least a part of the stored voice input if a size of the stored voice input is larger than a predetermined value.

12. The method according to claim 8, wherein the receiving comprises receiving the voice input from a remote controller for controlling the display apparatus.

13. The method according to claim 8, wherein the determining comprises transmitting test data to the external server to determine whether the display apparatus is connected to the external server.

14. The method according to claim 13, wherein the determining further comprises determining whether the display apparatus is connected to the external server based on an error rate of the test data.

15. A non-transitory computer-readable recording medium storing instructions of a method to be executed by a processor of a display apparatus, the method comprising:
receiving a voice input of a user;

in response to an event for activating a voice recognition function, determining, while receiving the voice input, whether the voice recognition function is activated, wherein when the voice recognition function is activated, the display apparatus is in a communication state with an external server;

in response to the determining that the voice recognition function is activated, transmitting the received voice input to the external server for voice processing; and in response to the determining that the voice recognition function is not activated, storing the received voice input in a memory, and in response to the determining that the voice recognition function is subsequently activated, transmitting the stored voice input to the external server for the voice processing.

* * * * *